Sept. 11, 1962 R. H. MELLOR 3,054,077
POTENTIOMETER
Filed May 19, 1960 2 Sheets-Sheet 1
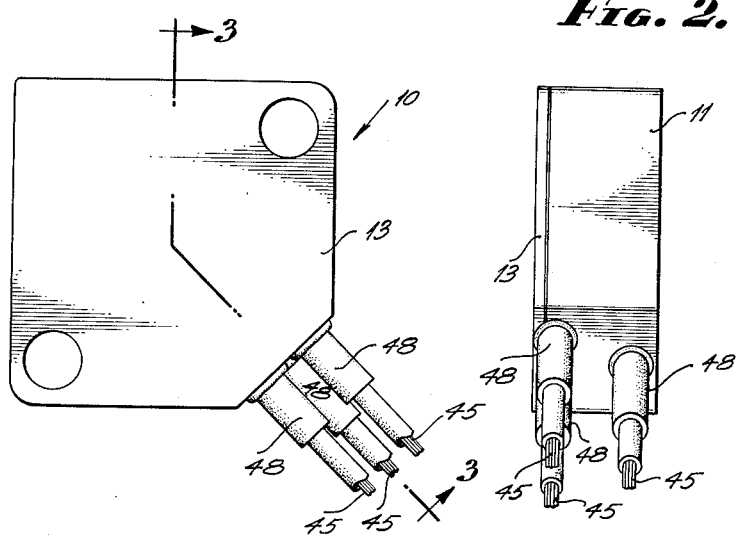
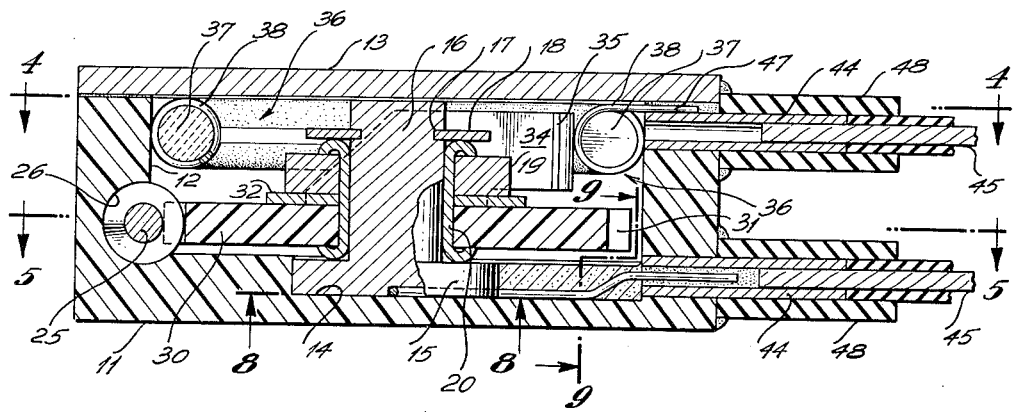
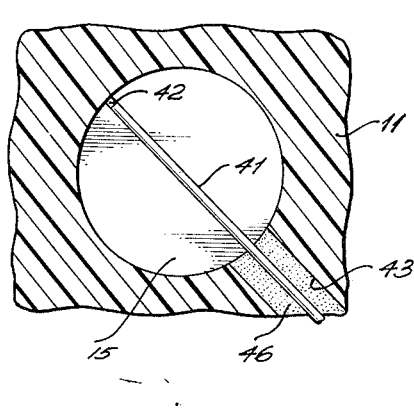
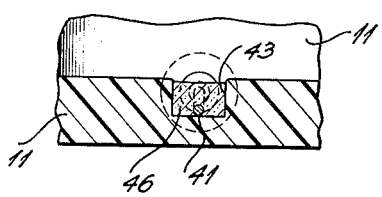
INVENTOR.
ROBERT H. MELLOR
BY
R.E. Geaugue
ATTORNEY Sept. 11, 1962
R. H. MELLOR
3,054,077
POTENTIOMETER
Filed May 19, 1960
2 Sheets-Sheet 2
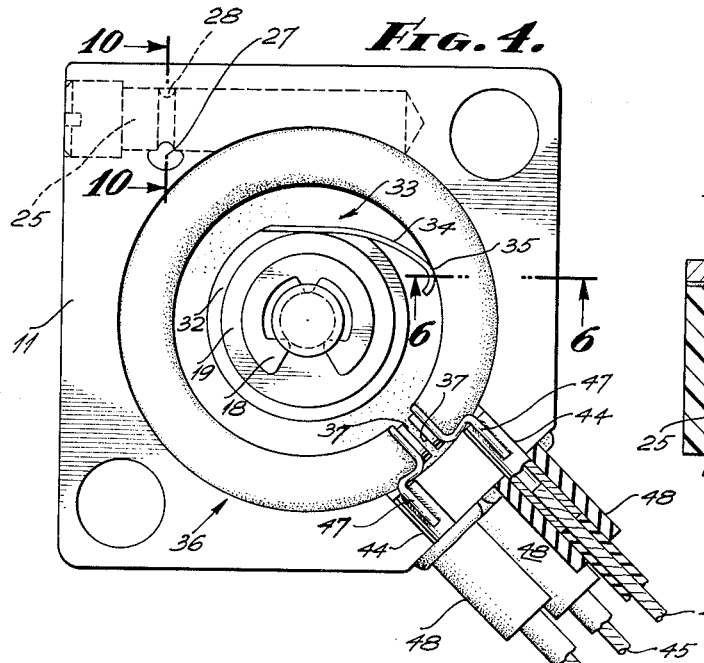
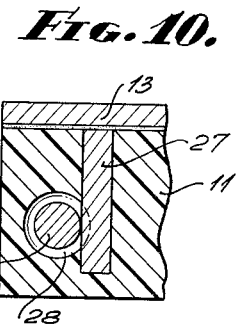
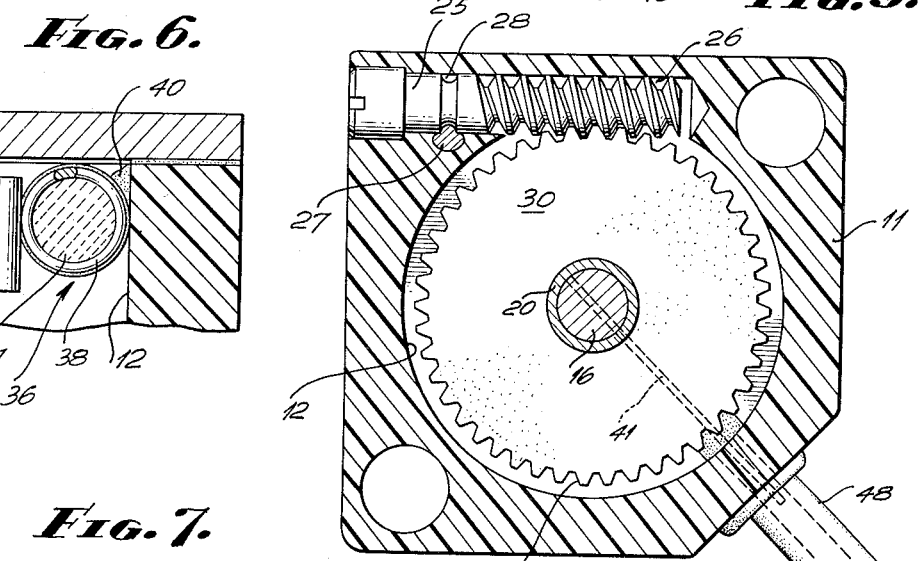
INVENTOR.
ROBERT H. MELLOR
BY
R. E. Geauque
ATTORNEY United States Patent Office 3,054,077
Patented Sept. 11, 1962

3,054,077
POTENTIOMETER
Robert H. Mellor, Reseda, Calif., assignor to M-C Instrument Corp., North Hollywood, Calif., a corporation of California
Filed May 19, 1960, Ser. No. 30,385
8 Claims. (Cl. 338—175)

This invention relates to certain new and useful improvements in variable electrical resistors and more particularly refers to a sub-miniature potentiometer of unique construction and performance.

Conventional sub-miniature potentiometers have been employed in the manufacture of electronic apparatus which incorporate a contact slider arm rotatably operated to engage the side of a C-shaped resistance wire wound coil assembly. The side of the coil offers a planar surface over which the slider arm travels circularly. Usually, at least two springs are required to maintain the slider arm in mechanical and electrical contact with the wire coil. Generally, the slider arm is mounted on a ball for rotation and one spring cooperates to maintain the slider arm in forcible contact with the planar surface while the other spring is employed with the potentiometer housing to insure proper electrical contact between the slider arm and the ball.

Difficulties have been encountered when employing potentiometers fashioned in the manner of this conventional construction which stem mainly from the fact that low contact pressure exists between the slider arm and the planar surface of the coil which results in the presence of electrical resistance. This resistance is a source of noise and other undesirable effects. Furthermore, the wiper arm is susceptible to "hang up" at the terminal ends of the wire wound coil and any uneven deflection of the two springs will change bearing pressure of the slider arm on the planar surface.

Accordingly the present invention obviates the above difficulties by employing a rotatable wiper which is radial in operation rather than planar and which engages in forcible contact with the inside diameter of the wire wound coil assembly. This construction avoids wiper "hang up" and by making the wiper resilient, avoids separate springs or dependence upon the potentiometer housing for establishing proper electrical contact between the wiper and other elements in the potentiometer circuit.

Therefore, it is a primary object of the present invention to provide a sub-miniature potentiometer having a radially operating wiper engageable with the inside diameter of a wire wound coil. This arrangement eliminates wiper "hang up" generally encountered when slider arms are employed operating on a planar surface and wherein the coil element is of a C-shaped configuration employing a quantity of solder on the ends of the wire to make connection with lead wires.

Another object of the present invention is to provide a potentiometer having a minimum number of parts and incorporating built-in spring biasing features which insures a constant wiper pressure against the wire wound coil as well as excellent electrical contact between the wiper and circuit elements of the potentiometer.

Still another object of the present invention is to provide a potentiometer having a unique terminal connection of the opposite wire wound coil ends with external connectors which eliminates "hang up" of the wiper and provides additional contact area for the wiper on the coil assembly than conventional potentiometer construction permits. This arrangement permits welded connections which greatly improves both electrical and mechanical characteristics.

Other objects of the invention and the various advantages and characteristics of the present potentiometer will be apparent from a consideration of the following detailed description when taken in connection with the accompanying drawings in which like numbers of reference denote corresponding parts throughout the several views; in which:

FIGURE 1 is a side elevational view of a potentiometer in accordance with the present invention;
FIGURE 2 is an end view of the potentiometer of FIGURE 1;
FIGURE 3 is an enlarged sectional view of the potentiometer of FIGURE 1 taken in the direction of arrows 3—3;
FIGURE 4 is a sectional view of the potentiometer of FIGURE 3 taken in the direction of arrows 4—4 showing the coil and wiper assembly;
FIGURE 5 is a sectional view of the potentiometer of FIGURE 3 taken in the direction of arrows 5—5 showing the gear mechanism;
FIGURE 6 is a fragmentary sectional view taken in the direction of arrows 6—6 of FIGURE 4;
FIGURE 7 is a perspective view of the wiper contact employed in the potentiometer of FIGURE 3;
FIGURE 8 is a fragmentary sectional view taken in the direction of arrows 8—8 of FIGURE 3;
FIGURE 9 is a sectional view taken in the direction of arrows 9—9 of FIGURE 3; and
FIGURE 10 is a sectional view taken in the direction of arrows 10—10 of FIGURE 4.

Referring now to the drawings, a potentiometer in accordance with the present invention is shown in FIGURES 1–4 which comprises, in general, a case 10 which is composed of a housing 11 having a circular cavity 12 and a side member 13 employed for sealing the cavity. Communicating with the cavity and within the housing situated in the center thereof, there is provided a recess 14 which receives a circularly based metallic shaft member 15. The base of shaft member 15 is slip fitted into recess 14 and is retained therein with an adhesive cement. A stub shank 16 of the shaft extends through the center of cavity 12 and terminates adjacent the inside surface of side member 13. Shank 16 is provided with an annular recess 17 into which a snap ring 18 is positioned for retaining a wiper mechanism and a gear mechanism on to the shaft member.

A cylindrical bearing member 20 is provided between the base of the shaft member 15 and snap ring 18. The opposite ends of the cylindrical bearing 20 are swedged or turned over to hold the wiper mechanism and the gear drive assembly as a unit on the shaft 15. Spacer 19 is located between the retention end of the bearing and the washer assembly.

As shown more clearly in FIGURE 5, the gear drive assembly comprises a worm gear 25 which is retained in a longitudinal recess 26 by means of a holding pin 27 which cooperates with an annular recess 28 provided in the shank of the worm gear. As shown in FIGURE 5, the gear 25 is in mesh with a gear 30 having teeth 31. The teeth of the gear are meshed with the teeth on the worm 25.

Adjacent to the gear 30, there is provided a wiper mechanism 33 as shown in FIGURE 7. The wiper comprises washer element 32 as an integral member of the wiper element 34. For ease of manufacturing, the washer and wiper element are fabricated from an integral piece of sheet metal and the wiper element 34 includes on its terminal end, a curved wiping surface 35. Wiper element 34 is cantilevered with respect to element 32 and is resilient so that it will readily flex upon a change of load or pressure applied on the surface 35.

Positioned within the circular cavity 12 is an annular resistive element 36 which includes a mandril 37 covered by a wound resistance wire 38. The wire is suitably insulated from the mandril and from adjacent turns of wire. Although the resistive element as shown and described is of a wound wire variety, it is to be understood that resistive elements taking other forms may be employed such as a resistive deposited film for example. The circular resistive element 36 is arranged co-axially with the shaft 15 so that the wiper surface 35 engages and travels in contact with a circular or arcuate surface presented by the inside diameter of the element. It is also to be noted that the surface of the resistive element being wiped is nonplanar and that the rotary action of the present wiper is truly radial and not planar as is the case with conventional devices.

Inasmuch as the element 34 is of resilient sheet metal, a constant spring biasing is provided by the wiper element 34 to present an even loading pressure as the wiper progresses along its circular path from one radial position to another. This construction eliminates the necessity for additional springs normally required to achieve a suitable electrical contact between the wiper element and other elements of the potentiometer circuit since as the applied force or pressure of the wiper element 34 against the resistive element will operate to provide an equal and opposite applied force or pressure on the shaft shank 16 by the bearing 20 on which the wiper is carried. Therefore, the resiliency and flexible nature of wiper element 34 serves a dual function of applying a wiping contact pressure against the inside diameter of the resistive element and applying a bearing to shaft contact pressure to insure a suitable electrical connection. Thus, it can be seen that the bearing is an electrical connection as well as a wiper mechanism mounting.

As shown in FIGURE 6, the resistive element including the wound wire is retained within cavity 12 by securing the assembly to the annular wall of the cavity associated with housing 11 by conventional means such as cement 40 for example.

As shown in FIGURES 8 and 9, an electrical connector 41 is secured by soldering into a recess 42 within the base of the shaft element 15. The connector 41 leads from the shaft element through a recess 43 in the housing 11 and is spot welded or soldered to a tubular member 44 as shown in FIGURE 3. The opposite end of tube 44 is arranged to receive a wire conductor 45 which is soldered to the interior of tube 44. Recess 43 is provided with an insulating material 46 which covers the wire lead 41. It is noted that the opposite ends of the wire which is wound about mandril 37 of the resistive element assembly is attached to the outside of another tube 44 by spot welding at point 47. By forming a connection at this point rather than somewhere on the resistive element, wiper "hang up" is eliminated and the wiper can travel over a greater circular area thereby taking greater advantage of the available surface area of the resistive element to be wiped.

External lead wires 45 are fixed to the tubes 44 by first dipping the ends of the wire in solder and then inserting these ends into tubes which when heated will cause adhesion to the tubes. The externally projecting portions of the connector tubes 44 and the wire leads may be wrapped with tape 48.

In actual operation, worm gear 25 may be manually rotated to actuate gear 30 which in turn causes bearing member 17 to rotate. Inasmuch as the wiper mechanism 33 is carried on bearing member 20, the wiper element 32 will cause the wiping surface 35 to travel along a path defined by the inside diameter of the circular resistive element assembly. Because of the resilient nature of the wiping element, the gear can float radially and axially without lessening contact pressure between the wiper surface and the inside diameter of the coil. Electrical contact is made with the wiper assembly by means of connector 41 affixed to the shaft element 15 while the terminal ends of the wound wire of the resistive element terminate through separate insulated connecting tubes 44. The case of the potentiometer is fabricated from a plastic insulating material.

Having described only a typical form of the invention I do not wish to be limited to the specific details herein set forth, but wish to reserve to myself any variations or modifications that may appear to those skilled in the art and fall within the scope of the following claims.

I claim:
1. A sub-miniature potentiometer comprising, a housing having a circular cavity, a circular resistive element supported in the cavity following the cavity configuration, a shaft element of constant cross section supported on the housing extending through the cavity, a bearing element rotatably mounted on the shaft element, a self-biasing flexible wiper element fixed on the bearing element having a wiping surface engaging the inside diameter of the resistive element, means on opposite ends of the bearing element for securing the wiper element to the bearing element, the flexible wiper element arranged to urge the bearing element into forcible electrical contact with the shaft element, and manually operable means drivingly engaged with the bearing element and extending outwardly through a side wall of the housing for rotating the bearing element from the exterior of the housing to vary the position of the wiper element on the resistive element.

2. A sub-miniature potentiometer comprising, a housing having a circular cavity defined by the side wall of the housing, a circular resistive element fixed to the side wall of the housing following the cavity configuration, a shaft element of constant cross section supported on the housing extending through the cavity substantially on the central vertical axis thereof, a bearing rotatably mounted on the shaft element, a resilient wiper element fixed on the bearing having a curved wiping surface radially outwardly biased into frictional slidable engagement with the inside diameter of the resistive element and arranged to urge the bearing element into positive electrical contact with the shaft element, means on opposite ends of the bearing element for securing the wiper element to the bearing element, and manually operable means drivingly engaged with the bearing and extending outwardly through a side wall of the housing for rotating the bearing from the exterior of the housing to vary the position of the wiping surface on the resistive element.

3. A sub-miniature potentiometer comprising, a housing having a circular cavity defined by the annular side wall of the housing, a resistive element bonded to the side wall of the housing following the cavity configuration, a shaft element of constant cross section supported on the housing extending through the cavity substantially on the central vertical axis thereof, a sleeve bearing rotatably mounted on the shaft element, a resilient wiper element mounted on the bearing element having a curved wiping surface radially outwardly biased into frictional slidable engagement with the inside diameter of the resistive element, the flexible wiper element arranged to urge the bearing element into forcible electrical contact with the shaft element, manually operable means drivingly engaged with the bearing and extending outwardly through a side wall of the housing for rotating the bearing from the exterior of the housing to vary the position of the wiper element on the resistive element, and means formed from opposite ends of the bearing for cooperatively retaining the wiper element and the last mentioned means on the bearing to operate as a unit.

4. A sub-miniature potentiometer comprising, a housing having a circular cavity defined by the side wall of the housing, a circular resistive element bonded to the side wall of the housing presenting an arcuate surface toward the center axis of the element, a shaft element of constant cross section supported on the housing extending through the center of the cavity, a bearing rotatably mounted on the shaft element, a resilient wiper element fixed on the bearing element having a wiping surface radially outwardly biased into frictional slidable engagement with the arcuate surface of the resistive element and operating against the resistive element to urge the bearing into positive electrical contact with the shaft, a snap ring arrangement engageable with the shaft element to retain the bearing on the shaft element, an electrical conductor fixed to the shaft element communicating the shaft element exteriorly of housing, a second and third electrical conductor fixed to the opposite ends of the resistive element leading exteriorly of the housing, and manually operable means drivingly engaged with the bearing and extending outwardly through a side wall of the housing for rotating the bearing from the exterior of the housing to vary the position of the wiper element on the arcuate surface of the resistive element.

5. The invention as defined in claim 4 wherein the second and third conductors are welded to the opposite ends of the resistive element at a location remote from the arcuate surface.

6. A sub-miniature potentiometer comprising, a housing having a circular cavity defined by an annular side wall and a base, the base having a recess substantially in the center thereof, a shaft element having a base portion mounted in the housing recess and a shank portion extending into the housing cavity, a circular resistive element bonded to the annular housing side wall about the shank portion, a sleeve bearing rotatably carried on the shank portion, a snap ring arrangement cooperating with the shank portion to retain the bearing on the shank portion, a resilient leaf spring wiper element fixed on the bearing and having a curved wiper surface radially outwardly biased into frictional slidable engagement with an arcuate surface formed by the inside diameter of the resistive element and operative to urge the bearing into positive electrical contact with the shank portion of the shaft element, and manually operable means drivingly engaged with the bearing and extending outwardly through the base of the housing for rotating the bearing from the exterior of the housing to rotatably move the wiper element and vary the position of the wiper surface on the arcuate surface of the inside diameter of the resistive element, and means formed on opposite ends of the bearing for cooperatively retaining the wiper element and the last mentioned means on the bearing to operate as a unit.

7. The invention as defined in claim 6 whereby the sleeve bearing is maintained in suitable electrical contact with the shaft element by the spring biasing of the wiper element acting against the arcuate surface to develope a pressure on the bearing urging the bearing against the shank portion of the shaft element.

8. The invention as defined in claim 6 including at least a first, a second and a third connector tube extending through the housing; an electrical lead connected to first tube on one end and to the shaft element on its opposite end to establish electrical continuity from the wiper element to the first tube; the second and third tubes extending through the housing communicating the housing cavity exteriorly of the housing; the ends of the tubes adjacent the housing cavity having spot welded terminal connections for the opposite ends of the resistive element.

References Cited in the file of this patent

UNITED STATES PATENTS

| | | |
|---|---|---|
| 1,560,419 | Grebe | Nov. 3, 1925 |
| 1,774,814 | Reiter | Sept. 2, 1930 |
| 2,141,770 | Solomon | Dec. 27, 1938 |
| 2,389,750 | Turner et al. | Nov. 27, 1945 |
| 2,880,293 | Blanco | Mar. 31, 1959 |